Dec. 5, 1967     P. E. HEIDER     3,356,270
MATERIAL FLOW CONTROL WITH ROTARY SCREW
Filed May 27, 1966     3 Sheets-Sheet 1

INVENTOR
PAUL E. HEIDER
By Braddock & Burd
ATTORNEYS

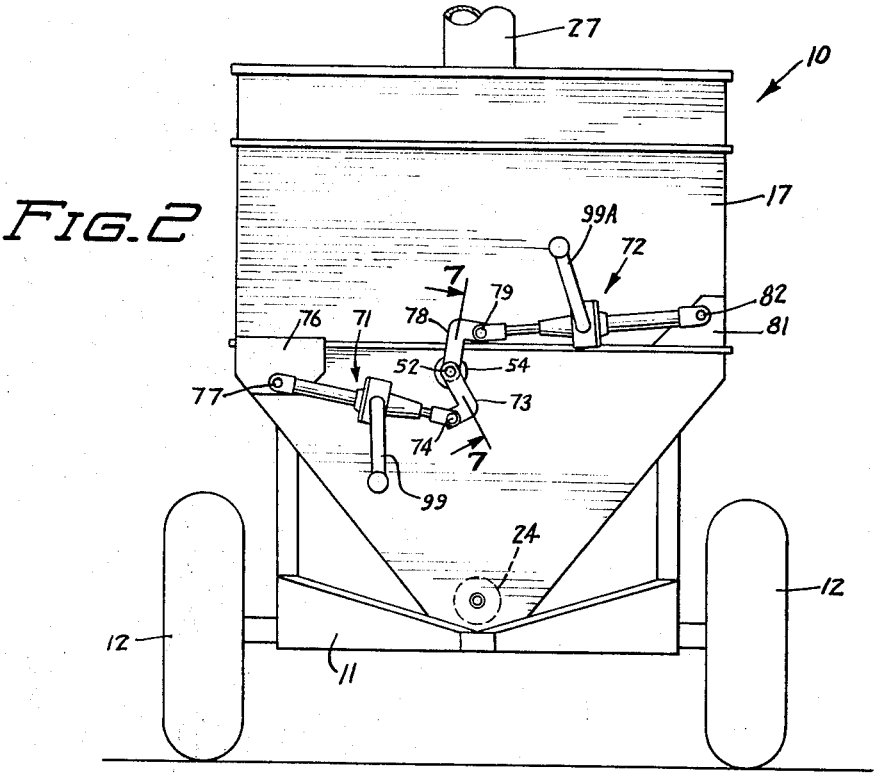
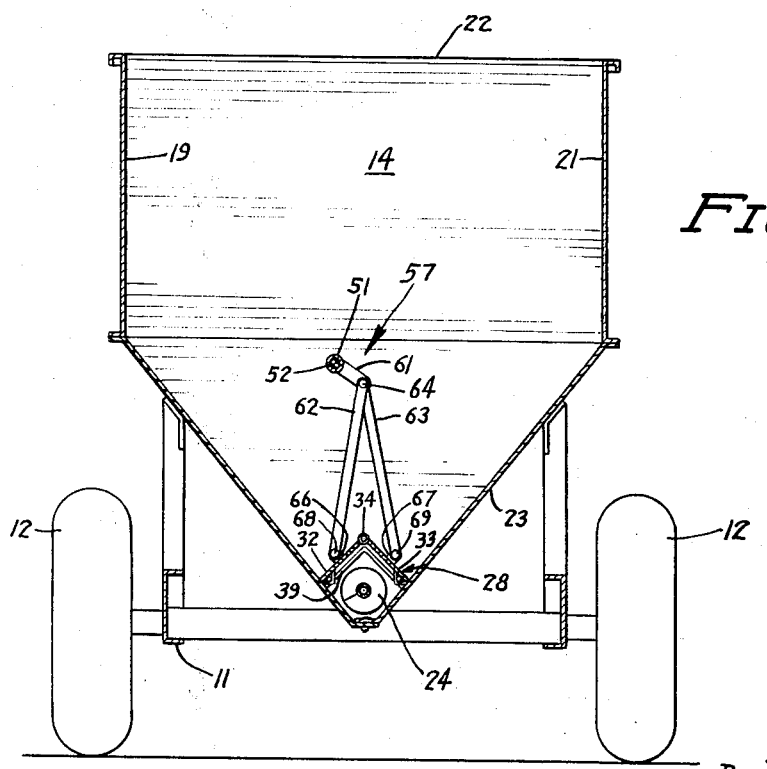

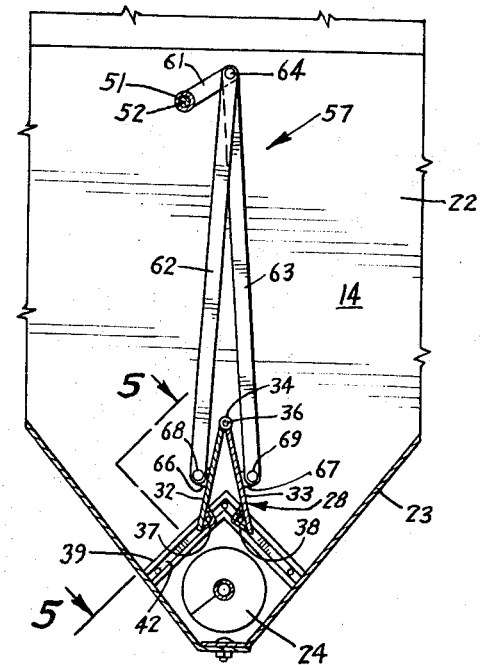
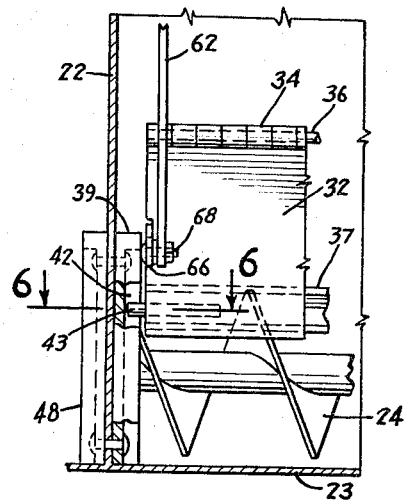
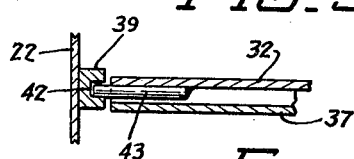
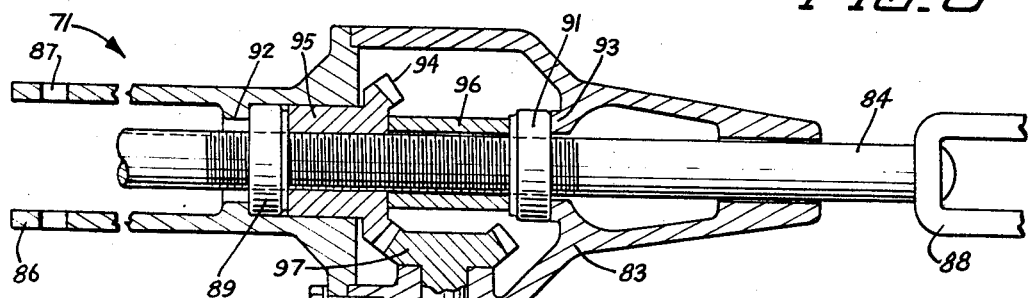
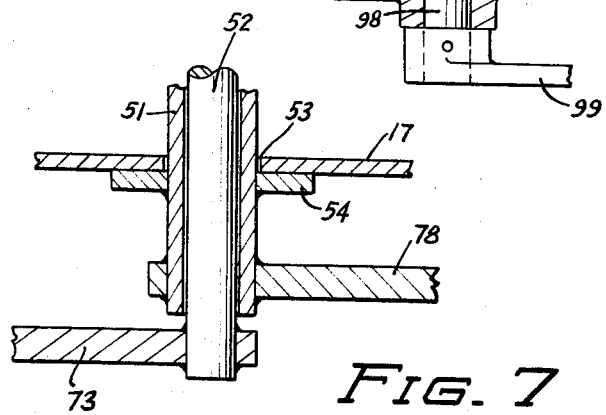

United States Patent Office 3,356,270
Patented Dec. 5, 1967

3,356,270
MATERIAL FLOW CONTROL WITH
ROTARY SCREW
Paul E. Heider, Carroll, Iowa 51401
Filed May 27, 1966, Ser. No. 553,402
7 Claims. (Cl. 222—413)

ABSTRACT OF THE DISCLOSURE

A self-unloading wagon having a front and a rear storage bin for feed. A single auger extended along the bottom of both bins is rotatable to move the feed through an opening in the back wall of the wagon into a boom auger. A pair of hinged cover plates are located over the auger in each bin. Each pair of cover plates have opposite end projections cooperating with inverted V-shaped guides mounted on the upright walls of the wagon for controlling the movement of the cover plates from folded open positions and expanded closed positions. Expandable and contractible screw jacks mounted on the front wall of the wagon are used to separately rotate telescoping shafts extended into the bins above and parallel to the cover plates. The screw jacks each have a threaded rod pivotally secured to an arm secured to one shaft, a housing attached to the front wall of the wagon and a crank turned screw in the housing on the threaded rod for positively expanding and contracting the shaft and housing to rotate each shaft in opposite directions. Pairs of links are used to connect the ends of the cover plates with the shafts so that on rotation of the shafts the cover plates are moved in the guide means to open and closed positions in response to the contraction and expansion of the screw jacks.

---

This invention relates to a material flow control for a container having a conveyor for removing material from the container. More particularly, the invention relates to a cover means controlled by power control assembly in combination with a self unloading wagon box having a longitudinal auger along the bottom of the wagon box for regulating the flow of particulate material from the wagon box into the auger which moves the material along the bottom of the box through a discharge opening.

Briefly described, the material flow control of the invention is used with a wagon box having a bottom wall and longitudinally spaced upright walls defining a storage bin for particulate materials, as shelled corn, soybeans, milo, granulated fertilizer, and the like. A conveyor means located adjacent the bottom wall of the wagon box operates to move material through an opening in one of the upright walls to discharge the material from the wagon box. The material flow control comprises a cover means longitudinally located over the conveyor means and selectively movable to an open position and a closed position to control the movement of the material from the bin into the conveyor means. Guides mounted on the upright walls coact with the opposite ends of the cover means to fold the cover means as it is raised to the open position whereby material is free to flow into the conveyor means.

The open and closed positions of the cover means is controlled by a power control assembly which includes a power unit mounted on one upright wall of the bin operable to exert force in opposite directions to raise and lower the cover means to its open and closed positions. The power unit is drivably connected to the cover means by a shaft means rotatably mounted on the upright walls and located above and generally parallel to the cover means. A linkage means connects the shaft means with the cover means whereby on rotation of the shaft means the cover means is moved to a raised open position or alternatively moved to a closed lower position.

In the drawings:

FIGURE 2 is a sectional view taken along the line 2—2 of FIGURE 1;

FIGURE 3 is a sectional view taken along the line 3—3 of FIGURE 1 showing the auger cover in the closed position;

FIGURE 4 is a sectional view similar to FIGURE 3 showing the auger cover in the open position;

FIGURE 5 is an enlarged sectional view taken along the line 5—5 of FIGURE 4;

FIGURE 6 is a sectional view taken along the line 6—6 of FIGURE 5;

FIGURE 7 is an enlarged sectional view taken along the line 7—7 of FIGURE 1; and FIGURE 8 is a horizontal sectional view of a two way thrust screw jack used to move the auger cover to the open and closed positions.

Figure 1:
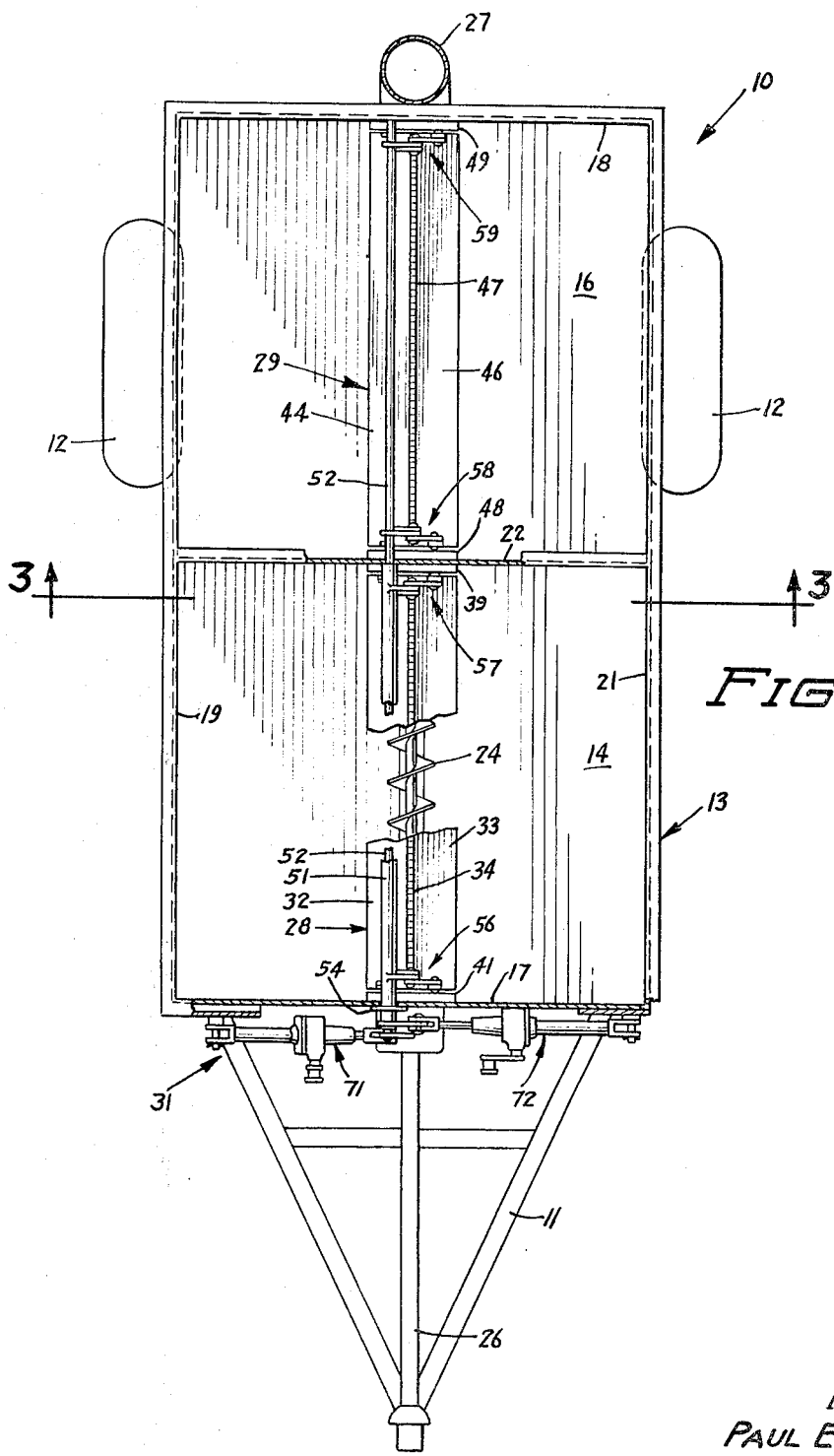
FIGURE 1 is a plan view with parts broken away of a self unloading wagon equipped with the material flow control of the invention.

Referring to the drawings there is shown in FIGURE 1, a self unloading wagon indicated generally at 10 adapted to be coupled to and towed by a power driven vehicle, as an agricultural tractor. Wagon 10 has a longitudinal frame 11 rotatably carrying a pair of wheels 12 used to support the wagon on the ground or like surfaces. An upright box or container 13 mounted on frame 11 has a pair of chambers or bins 14 and 16 for storing particulate materials, as shelled corn, soybeans, grain, milo, granulated fertilizer, ground feeds and like materials.

Box 13 is generally V-shaped in transverse cross-section and has an upright front end wall 17 and a similarly shaped upright rear end wall 18 joined to side walls 19 and 21. Transversely extended between side walls 19 and 21 is an upright partition or middle wall 22 which separates the forward bin 14 from the rear bin 16. As shown in FIGURE 3, a V-shaped bottom wall 23 supported on frame 11 is connected to end walls 17 and 18 and side walls 19 and 21 defining the open top bins 14 and 16.

Positioned longitudinally along the apex portion of bottom wall 23 is an elongated conveyor 24 operable to move particulate materials longitudinally along the bottom wall toward and through suitable openings in the middle wall 22 and rear end wall 18. Conveyor 24 is an auger having a continuous helical flight connected to an integrally shielded power take-off assembly 26 adapted to be coupled to the power take-off drive shaft of a tractor whereby torque is transmitted through the power take-off assembly to conveyor 24. Rotation of conveyor 24 carries material along the bottom wall 23 into an upright boom conveyor assembly 27 movably mounted on the bottom portion of rear wall 28. Boom assembly 27 is an upright conveyor including an auger located concentrically within a tube. An additional auger and tube may be connected to the upper end of the boom assembly and angularly moved with a hydraulic cylinder and hand pump whereby the particulate material may be discharged into a bunk feeder, fertilizer boxes, high bins, cattle feeders and the like.

As shown in FIGURE 1, a cover means 28 is located in bin 14 longitudinally over auger 24 and a similar cover means 29 is located in bin 16 longitudinally over the auger. Cover means 28 and 29 are independently movable to open and closed positions to control the movement of particular material in the bins toward and into conveyor 24. The open and closed positions of cover means 28 and 29 are determined by the operation of a power control assembly indicated generally at 31. Cover means 28 in the forward bin 14 may be opened whereby the conveyor carries the material from the forward bin along the bottom of the rear bin into an inlet of boom assembly 27. When cover means 29 is closed only material from a forward bin 14 will be discharged from the wagon. Alternatively, cover means 28 may be closed with cover means 29 open whereby material in rear bin 16 will be discharged from the wagon. Both cover means 28 and 29 may be open whereby the materials in both bins 14 and 16 are blended by the rotating auger 24 and discharged into boom conveyor assembly 27 and carried thereby to a discharge location.

As shown in FIGURES 3 and 4, cover means 28 comprises a pair of longitudinal plates 32 and 33. Adjacent upper edges of plates 32 and 33 have interlocking hinge sleeves 34 carrying a longitudinal rod 36 thereby forming a pivotal hinge joint movably connecting the adjacent edges of the plates. Plates 32 and 33 are flat rectangular members extended the length of bin 14 and are reinforced with angle bars 37 and 38 secured to the inner longitudinal edges of the plates. The plates move from a lowered closed position as shown in FIGURE 3 to a raised open position as shown in FIGURE 4 whereby material in bin 14 is free to flow under the plates into the area of conveyor 24. Movement of plates 32 and 33 is controlled by guides 39 and 41 secured to walls 22 and 17 respectively. Guides 39 and 41 are identical in structure and function to fold and unfold the plates as they are moved from their open and closed positions.

As shown in FIGURE 4, guide 39 has a generally inverted V-shape and is located over conveyor 24. As shown in FIGURES 4, 5 and 6, guide 39 has inwardly open inverted V-shaped channels or ways 42 forming a guide way for fingers 43 secured to the inner sides of plates 32 and 33. Guide 41 has similar grooves which coact with fingers secured to the opposite ends of plates 32 and 33. The fingers ride in the grooves to control the folding or relative pivotal movements of plates 32 and 33 as the plates are moved from their open and closed positions to control the flow of material into conveyor 24.

Cover means 29 shown in FIGURE 1 has a pair of longitudinal plates 44 and 46 extended over the section of conveyor 24 located in bin 16. The upper adjacent edges of the plates are pivotally connected together by hinge 47. The plates fold to an open raised position and unfold to a closed lower position in a manner similar to plates 32 and 33. Opposite ends of the plates 44 and 46 have outwardly projected fingers which coact with inverted V-shaped guides 48 and 49 to control the folding of plates 44 and 46. Guides 48 and 9 are identical in construction and function with guide 39 shown in FIGURES 4, 5 and 6.

Power control assembly 31 has elongated control shaft means located above and extended substantially parallel to cover means 28 and 29. The control shaft comprises an outer tubular shaft or pipe 51 projected through a hole 53 in front end wall 17 and extended the length of bin 14 terminating adjacent intermediate wall 22. Positioned within and extended through tubular shaft 51 is an inner shaft 52 which projects through a hole in intermediate wall 22 and extends the full length of bin 16. The rear end of shaft 52 is rotatably mounted on end wall 18. As shown in FIGURE 7, the forward end of shaft 52 projects forwardly of outer tubular shaft 51. Secured to shaft 51 adjacent the outside of front wall 17 is a collar 54 covering the peripheral edge of hole 53 to minimize movement of particulate material through hole 53. Shaft 52 is free to rotate independent of the tubular shaft 51 and controls the open and closed positions of cover means 29 thereby regulating the movement of material from bin 16 into conveyor 24. Rotation of tubular shaft 51 controls the open and closed positions of cover means 28 in front bin 14.

As shown in FIGURE 1, a first pair of linkages 56 and 57 operatively couple the opposite ends of cover means 28 to outer shaft 51 whereby angular movement of shaft 51 moves the cover means 28 to open and closed positions with respect to bottom wall 23. A second pair of linkages 58 and 59 couples the opposite ends of cover means 29 with inner shaft 52 whereby angular movement of the inner shaft controls the open and closed positions of cover means 29. Linkages 56, 57, 58 and 59 are identical in construction and operation. Linkage 57 shown on FIGURES 3 and 4 is illustrative of the structural details of the remaining linkages.

Linkage 57 comprises a radial arm 61 secured to shaft 51 and projected into the upright longitudinal plane of cover means 28. A pair of downwardly extended links 62 and 63 are pivotally mounted by a pivot pin 64 to the outer end of arm 61. The lower ends of links 62 and 63 are located adjacent ears 66 and 67 secured to plates 32 and 33. Pivot pins or bolts 68 and 69 pivotally connect links 62 and 63 to the ears thereby operatively connecting cover plates 32 and 33 with shaft 51.

Referring to FIGURES 1 and 2, power control assembly 31 includes a pair of power units indicated generally at 71 and 72 operable to selectively rotate or angularly move tubular shaft 51 and inner shaft 52. Power units 71 and 72 are identical in construction and operation. They are crank operated screw jacks which expand and contract to transmit torque in opposite directions to shafts 51 and 52. The power units have thrust bearings for absorbing or transmitting thrust in opposite directions.

As shown in FIGURE 2, power unit 71 is located between a downwardly extended L-shaped arm 73 secured to shaft 52 and a bracket 76 secured to front end wall 17 of the box. A pin 74 pivotally connects power unit 71 to the lower end of arm 73. Stud pin 77 projected forwardly from bracket 76 pivotally connects the opposite end of power unit 71 to bracket 76. A similar L-shaped arm 78 secured to and projected upwardly from shaft 51 is pivotally connected by pin 79 to power unit 72. The opposite end of unit 72 is pivotally connected to an upright bracket 81 by a stud pin 82 projected forwardly from the bracket. Bracket 81 is mounted on the forward side of front end wall 17. Power units 71 and 72 located closely adjacent the front side of front end wall 17 are operable to transmit torque in opposite directions to arms 73 and 78 respectively thereby positively moving cover means 28 and 29 to their respective open and closed positions. The power units have sufficient mechanical advantage enabling cover means 28 and 29 to be easily moved to their open and closed positions when bins 14 and 16 are filled with particulate materials.

Referring to FIGURE 8, there is shown a longitudinal cross-section of power unit 71. Power unit 71 comprises a housing or body 83 having a longitudinal passage accommodating a screw or elongated rod having screw threads 84. One end of the body has a bifurcated end 86 having a transverse hole 87 for receiving pin 77 projected forwardly from bracket 76 thereby pivotally mounting the body on the bracket. The opposite end of screw 84 carries a U-shaped clevis 88 having a transverse hole for accommodating pin 74 used to pivotally connect the unit to arm 73. Screw 84 projects through a pair of axially spaced thrust bearings 89 and 91 located within housing 83. Thrust bearings 89 and 91 seated against inwardly projected shoulders 92 and 93 transmit force in opposite directions to body 83. Located within body 93 between thrust bearings 89 and 91 is a bevel gear 94 threaded onto screw 84. Bevel gear 94 has an axial hub 95 which engages thrust bearing 89. A sleeve 96 is interposed between thrust bearing 91 and bevel gear 94 thereby fixing the location of the bevel gear with respect to housing 83.

A normally disposed drive bevel gear 97 located within housing 83 has teeth in meshing engagement with the teeth of bevel gear 94. Drive bevel gear 97 is rotatably mounted on a shaft 98 rotatably mounted on housing 83. A crank handle 99 secured to the outer end of shaft 98 provides a lever enabling the operator to manually rotate shaft 98 and thereby rotate bevel gears 97 and 94 which in turn axially move screw 84 relative to housing 83 thereby either extending or contracting power unit 71. Thrust bearings 89 and 91 are operable to transmit thrust in both directions to housing 83 whereby arm 73 is angularly moved. Power can be applied to inner shaft 52 in both rotational directions by angularly moving arm 73 with power unit 71. The double acting thrust characteristics of power unit 71 enables cover means 29 to be easily raised and lowered.

In use, power control assembly 31 is operable to hold cover means 28 and 29 in closed positions with the plates 32 and 33 and 44 and 46 in engagement with bottom wall 23 as illustrated in FIGURE 3. Cover means 28 and 29 may be selectively open by the operation of power units 71 and 72. To open the cover means 28 in front bin 14, power unit 72 is actuated by rotating the crank handle 99A to expand the overall length of the power unit thereby moving arm 78 and rotating outer shaft 51 in a counterclockwise direction as shown in FIGURES 2 and 4. This moves the arm 61 in an upward direction carrying links 62 and 63 upwardly. As the links 62 and 63 move upwardly plates 32 and 33 fold together about hinge 34. Fingers 43 ride in the channels or ways 42 of the guides 39 and 41 whereby the plates 32 and 33 fold together providing a minimum of interference to material flowing from bin 14 into the area of conveyor 24. Plates 32 and 33 can be returned to the closed positions as shown in FIGURE 3 by rotating the crank handle 99A in an opposite direction and thereby contracting the overall length of power unit 72. This rotates outer shaft 51 in an opposite direction. Plates 44 and 46 located in the rear bin 16 are moved to open and closed positions with the operation of power unit 71. Power unit 72 operates in identical manner with power unit 72.

Power units 71 and 72 are separately operated and therefore can independently control the open and closed positions of cover means 28 and 29. The cover means may be open or closed in varying amounts to mix and blend feed in conveyor 24 which is operated by the power takeoff of the tractor. Conveyor means functions to move the material which flows into the conveyor rearwardly of the wagon box into the inlet of the boom auger assembly 27 which is driven by conveyor 24 to discharge the material from the wagon.

Although the invention has been described with respect to a portable container, box, or self unloading wagon it is understood that the container or box may be mounted in a fixed location. It is intended that other changes, modifications, substitutions, changes in form, details of the cover means and power control assembly may be made by those skilled in the art without departing from the spirit of the invention.

The embodiments of the invention in which an exclusive property or privilege is claimed are defined as follows:

1. A material flow control for a self unloading container having a bottom wall and longitudinally spaced upright end walls, a conveyor located adjacent the bottom wall operable to move material from the container through an opening in one of the end walls, comprising: elongated cover means positioned between said upright walls and over said conveyor, said cover means selectively movable to an open position allowing material in the container to flow into the conveyor and movable to a closed position to prevent the movement of material into the conveyor, said cover means comprising a pair of cover members arranged in an inverted V-relation extended between said end walls at a position above the conveyor and a hinge connection coupling adjacent sides of said cover members, shaft means rotatably mounted on said upright walls above and generally parallel to the elongated cover means, inverted V-shaped guide means mounted on the upright walls, coacting groove and slide means on said guide means and the cover members for controlling the movement of the cover members between an open folded position and a closed unfolded position whereby the cover members have substantial equal movements so that the entrance openings on the opposite sides of the conveyor are always substantially equal, linkage means connecting the shaft means and cover means whereby on rotation of the shaft means said cover means is moved to selective open and closed positions, and expandable and contractable power means for selectively rotating the shaft means in opposite directions thereby moving the cover means to open and closed positions to control the movement of material to the conveyor, said power means having a first member connected to the shaft means, a second member connected to one of the side walls, and a third member operable to effect positive relative expansion and contraction of the first and second members.

2. The control defined in claim 1 wherein said linkage means comprises a plurality of arms secured to the shaft means and a pair of links pivotally connected to the outer ends of each arm, and means pivotally connecting the lower ends of the links to the cover members.

3. The control defined in claim 1 wherein said power means comprises a crank operated screw jack having means for transmitting thrust in opposite directions whereby the jack is operable to transmit torque in opposite directions to the shaft means.

4. A material flow control for a self unloading container having a bottom wall and a plurality of spaced upright walls defining a front bin and a rear bin, a conveyor located adjacent the bottom wall operable to move material longitudinally through the front bin and the rear bin discharging material from the container, comprising: first elongated two-piece cover means located in said front bin over said conveyor, second elongated two-piece cover means located in said rear bin over said conveyor, said first cover means and said second cover means individually and selectively movable to raised open positions and lowered closed positions to control the flow of materials from the front bin and the rear bin into the conveyor, guide means mounted on the upright walls for controlling the movements of each piece of the first and second cover means so that each piece of said cover means has substantial equal movement with its corresponding piece whereby the entrance openings on the opposite sides of the conveyor in the front bin and the rear bin are always substantially equal, first tubular shaft means rotatably mounted on said upright walls above and generally parallel to said first cover means, second shaft means telescoped within said first tubular shaft and extended longitudinally of the front bin and the rear bin, first linkage means connecting the first tubular shaft to the first cover means, second linkage means connecting the second shaft to the second cover means, first expandable and contractable power unit connected to said first shaft and one of said upright walls for selectively rotating said first shaft in opposite directions thereby moving the first cover means to open and closed positions and second expandable and contractable power unit connected to said second shaft and said one upright wall for selectively rotating said second shaft in opposite directions thereby moving the second cover means to open and closed positions independently of movements of the first cover means, each of said power units having a first member connected to a shaft, a second member connected to the one side wall and a third member operable to effect positive relative expansion and contraction of the first and second members.

5. The control defined in claim 4 wherein said first cover means and said second cover means each comprise a pair of cover members arranged in an inverted V-relation and hinge means coupling adjacent sides of said cover members and said guide means comprising inverted V-shaped guide means mounted on said upright walls over the conveyor, coacting groove and slide means on said guide means and cover members for guiding the movement of the cover members between an open folded position and a closed unfolded position whereby the cover members have substantial equal movement so that the entrance openings on the opposite sides of the conveyor are always substantially equal.

6. The control defined in claim 4 wherein said first cover means and said second cover means each comprise a pair of cover members arranged in an inverted V-relation and hinge means coupling adjacent sides of said cover members, said first linkage means and said second linkage means comprising a plurality of arms secured to the first tubular shaft and the second shaft respectively, a pair of links pivotally connected to the outer ends of each arm, and means connecting the lower ends of the links to the cover members.

7. The control defined in claim 4 wherein said first power unit and said second power unit each comprise a crank operated screw jack having means for transmitting thrust in opposite directions.

References Cited
UNITED STATES PATENTS

| | | | |
|---|---|---|---|
| 2,394,006 | 2/1946 | Osgood | 214—83.2 |
| 2,412,121 | 12/1946 | Bradshaw | 214—83.2 |
| 2,573,193 | 10/1951 | Goldsberry | 214—83.2 X |
| 2,601,608 | 6/1952 | Hansen | 222—413 |
| 2,614,708 | 10/1952 | Hoffstetter | 214—83.2 X |
| 2,776,078 | 1/1957 | Raynor | 222—413 |
| 3,040,939 | 6/1962 | McCollough | 222—413 X |

SAMUEL F. COLEMAN, *Primary Examiner.*